United States Patent
Prodzenko et al.

(10) Patent No.: US 12,217,628 B2
(45) Date of Patent: Feb. 4, 2025

(54) MAGNETIC TRACKING IN AN EXTENDED REALITY TRAINING SYSTEM

(71) Applicant: STREET SMARTS VR INC., New York, NY (US)

(72) Inventors: Gregory Prodzenko, Philadelphia, PA (US); Jeffrey Jarrard, New York, NY (US)

(73) Assignee: Street Smarts VR, Inc., New York, NY (US)

(*) Notice: Subject to any disclaimer, the term of this patent is extended or adjusted under 35 U.S.C. 154(b) by 0 days.

(21) Appl. No.: 18/074,949

(22) Filed: Dec. 5, 2022

(65) Prior Publication Data

US 2024/0185736 A1     Jun. 6, 2024

(51) Int. Cl.
  *G09B 9/00*   (2006.01)
  *G06F 3/01*   (2006.01)
  *G06T 11/00*  (2006.01)

(52) U.S. Cl.
  CPC ............ *G09B 9/00* (2013.01); *G06F 3/011* (2013.01); *G06T 11/00* (2013.01); *G09B 9/003* (2013.01)

(58) Field of Classification Search
  CPC ............ G09B 9/00; G09B 9/003; G06F 3/011
  See application file for complete search history.

(56) References Cited

U.S. PATENT DOCUMENTS

| | | | |
|---|---|---|---|
| 6,050,822 A * | 4/2000 | Faughn | G06F 3/011 482/902 |
| 9,261,332 B2 | 2/2016 | Northrup | |
| 9,267,762 B2 | 2/2016 | Northrup | |
| 9,960,492 B2 | 5/2018 | Cobos Reyes | |
| 10,030,937 B2 | 7/2018 | Northrup | |
| 10,234,240 B2 | 3/2019 | Northrup | |
| 10,274,287 B2 | 4/2019 | Northrup | |
| 10,505,278 B2 | 12/2019 | Cobos Reyes | |
| 10,584,940 B2 | 3/2020 | Northrup | |
| 10,637,144 B2 | 4/2020 | Arcos | |
| 10,707,565 B2 | 7/2020 | Navarro Pérez | |
| 11,015,902 B2 | 5/2021 | Northrup | |
| 11,194,386 B1 * | 12/2021 | Zhao | G06F 3/011 |
| 11,221,814 B2 | 1/2022 | Browy | |
| 11,329,383 B2 | 5/2022 | Canete Cabeza | |
| 11,455,137 B2 | 9/2022 | Browy | |

(Continued)

*Primary Examiner* — Peter R Egloff
(74) *Attorney, Agent, or Firm* — DLA Piper LLP (US)

(57) ABSTRACT

In an embodiment, an extended reality training system is disclosed that includes an extended reality display device, an emitter, a receiver attached to an object and a processor. The processor obtains tracking data for the object based at least in part on a detection by the receiver of a magnetic field generated by the emitter. The processor obtains training scenario data corresponding to an extended reality training scenario and generates the extended reality training scenario based at least in part on the tracking data and the training scenario data. The extended reality training scenario comprises a representation of the object at a location and orientation in a virtual space that corresponds to a location and orientation of the object indicated by the tracking data. The processor provides the extended reality training scenario to the extended reality display device to present the representation of the object to a user.

19 Claims, 5 Drawing Sheets

(56) References Cited

U.S. PATENT DOCUMENTS

| | | | | |
|---|---|---|---|---|
| 2010/0321383 A1* | 12/2010 | Nakamura | ............. | G06F 3/017 |
| | | | | 345/419 |
| 2015/0260474 A1* | 9/2015 | Rublowsky | ............. | F41A 33/00 |
| | | | | 434/16 |
| 2016/0314703 A1* | 10/2016 | Biran | ........................ | G06T 3/08 |
| 2019/0049544 A1* | 2/2019 | Muratov | ................. | G06F 3/011 |
| 2023/0306348 A1* | 9/2023 | Hadi | .................. | G06Q 10/0639 |

* cited by examiner

MAGNETIC TRACKING IN AN EXTENDED REALITY TRAINING SYSTEM

CROSS REFERENCE TO RELATED APPLICATION

This application is related to the following patents and applications, which are incorporated by reference herein in their entirety:

U.S. patent application Ser. No. 16/930,050, entitled "MAGAZINE SIMULATOR FOR USAGE WITH WEAPONS IN A VIRTUAL REALITY SYSTEM," filed on Jul. 15, 2020, and issued as U.S. Pat. No. 11,346,630 on May 31, 2022, U.S. patent application Ser. No. 16/930,060, entitled "A VIRTUAL REALITY SYSTEM FOR USAGE WITH SIMULATION DEVICES," filed on Jul. 15, 2020, U.S. patent application Ser. No. 17/203,480, entitled "DYNAMIC SCENARIO CREATION IN VIRTUAL REALITY SIMULATION SYSTEMS," filed on Mar. 16, 2021, U.S. patent application Ser. No. 17/412,803, entitled "RECOIL MOUNT FOR USAGE WITH WEAPONS IN A VIRTUAL REALITY SYSTEM," filed on Aug. 26, 2021, U.S. patent application Ser. No. 17/412,818, entitled "APPARATUS FOR ADAPTING REPLICA WEAPONS TO A VIRTUAL REALITY SYSTEM," filed on Aug. 26, 2021, U.S. patent application Ser. No. 17/412,836, entitled "MOUNT FOR ADAPTING WEAPONS TO A VIRTUAL TRACKER," filed on Aug. 26, 2021. and U.S. patent application Ser. No. 17/685,153, entitled "VIRTUAL REALITY BATON TRAINING DEVICE," filed on Mar. 2, 2022.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

This application relates to extended reality training systems, and in particular, magnetic tracking in an extended reality training system.

It has long been desired to provide personnel training to improve their skills in aiming and firing shotguns, rifles, handguns, and other weapons. Law enforcement and military training often place trainees into situations that require quick visual and mental assessment of the situation as well as an appropriate response with a weapon. Trainees are often subjected to adverse situations to evaluate their ability to effectively react.

Traditional training methods in marksmanship and firing tactics for hunters and other sportsmen, police, military personnel, and others, leave much to be desired from the aspects of realism, cost and practicality. Many firing ranges have limited capacity. Moreover, most existing firing ranges do not provide protection for the shooter against the natural elements such as rain or snow. Because of the noise levels normally associated with firing ranges, they are typically located in remote areas requiring people to have to drive to remote locations. The ammunition, targets and use costs for the range, make such training expensive. Furthermore, when live ammunition is used, expense, risks, administrative problems, safety concerns, and government rules and regulations are more burdensome. For training in marksmanship and tactics, it is beneficial to have an indoor range where shooters can fire simulated projectiles against simulated moving targets.

Video games are increasingly more realistic where users may be placed into immersive virtual environments. First-person-view shooting games offer players the ability to perform actions such as walking, crouching, shooting, etc., using a mouse and keyboard. However, these games are usually played in front of a computer where the user is sitting in a chair and are adequate for personnel training. Virtual reality systems may improve gaming experience where the player's movement in the game is dependent on their actions in physical space which makes the game more immersive than a traditional video game. Despite the realism provided by virtual reality systems, players are often provided with game controllers that are either tethered or have the look and feel of toys. As such, existing virtual reality game controllers that are representative guns differ from actual guns in feel and balance, and thus reduces the effectiveness of the training for real life.

Virtual reality weapons training systems using training weapons with realistic feel and functionality are desirable. It is also desirable to incorporate recoil in the training weapons to increase immersion. The incorporation of physical environmental objects in the virtual reality weapons training systems further increases immersion, for example, by allowing a user to physically interact with the environmental object. Such immersive experiences are an important part of how training systems provide value. However, existing virtual reality hardware may not accurately or correctly track and detect the firing of realistic training weapons or correctly track engagement with environmental objects by the user.

There may also be other difficulties involved with using realistic weapons in virtual reality systems. For example, some tracking technologies rely on line of sight, which may be disrupted by physical environmental objects within the training area. Some tracking technologies may constrain the play space through the placement of outside-in or inside-out beacons, inhibiting freedom of movement of the user. Some tracking technologies may rely on acceleration or angular velocity to track the location of the training weapons, which may be disrupted by recoil, high acceleration movements or vibrations. There is thus a need to provide improved hardware for virtual reality and other extended reality training simulators.

SUMMARY

In an embodiment, an extended reality training system is disclosed. The extended reality training system comprises an extended reality display device and an emitter located in a physical space. The emitter is configured to generate a magnetic field. The extended reality training system further comprises a receiver attached to an object located in the physical space. The receiver is configured to detect the magnetic field. The extended reality training system further comprises at least one processor coupled to memory. The at least one processor is configured to obtain tracking data for the object based at least in part on the detection of the magnetic field by the receiver. The tracking data indicates a location and orientation of the object. The at least one processor is further configured to obtain training scenario data corresponding to an extended reality training scenario and to generate the extended reality training scenario based at least in part on the tracking data and the training scenario data. The extended reality training scenario comprises a representation of the object at a location and orientation in a virtual space that corresponds to the location and orientation of the object indicated by the tracking data. The at least one processor is further configured to provide the extended reality training scenario to the extended reality display device. The extended reality display device is configured to present the representation of the object in the extended reality training scenario to a user of the extended reality display device.

In another embodiment, a method performed by at least one processor comprising hardware is disclosed. The method comprises obtaining tracking data for an object located in a physical space based at least in part on a detection of a magnetic field by a receiver attached to the object. The magnetic field is generated by an emitter located in the physical space. The tracking data indicates a location and orientation of the object. The method further comprises obtaining training scenario data corresponding to an extended reality training scenario and generating the extended reality training scenario based at least in part on the tracking data and the training scenario data. The extended reality training scenario comprises a representation of the object at a location and orientation in a virtual space that corresponds to the location and orientation of the object indicated by the tracking data. The method further comprises providing the extended reality training scenario to an extended reality display device. The extended reality display device is configured to present the representation of the object in the extended reality training scenario to a user of the extended reality display device.

In another embodiment, a non-transitory computer-readable medium is disclosed. The non-transitory computer-readable medium stores instructions that, when executed by at least one processor, cause the at least one processor to obtain tracking data for an object located in a physical space based at least in part on a detection of a magnetic field by a receiver attached to the object. The magnetic field is generated by an emitter located in the physical space. The tracking data indicates a location and orientation of the object. The instructions further cause the at least one processor to obtain training scenario data corresponding to an extended reality training scenario and to generate the extended reality training scenario based at least in part on the tracking data and the training scenario data. The extended reality training scenario comprises a representation of the object at a location and orientation in a virtual space that corresponds to the location and orientation of the object indicated by the tracking data. The instructions further cause the at least one processor to provide the extended reality training scenario to an extended reality display device. The extended reality display device is configured to present the representation of the object in the extended reality training scenario to a user of the extended reality display device.

The foregoing summary is illustrative only and is not intended to be in any way limiting. These and other illustrative embodiments include, without limitation, apparatus, systems, methods and computer-readable storage media. In addition to the illustrative aspects, embodiments, and features described above, further aspects, embodiments, and features will become apparent by reference to the drawings and the following detailed description.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
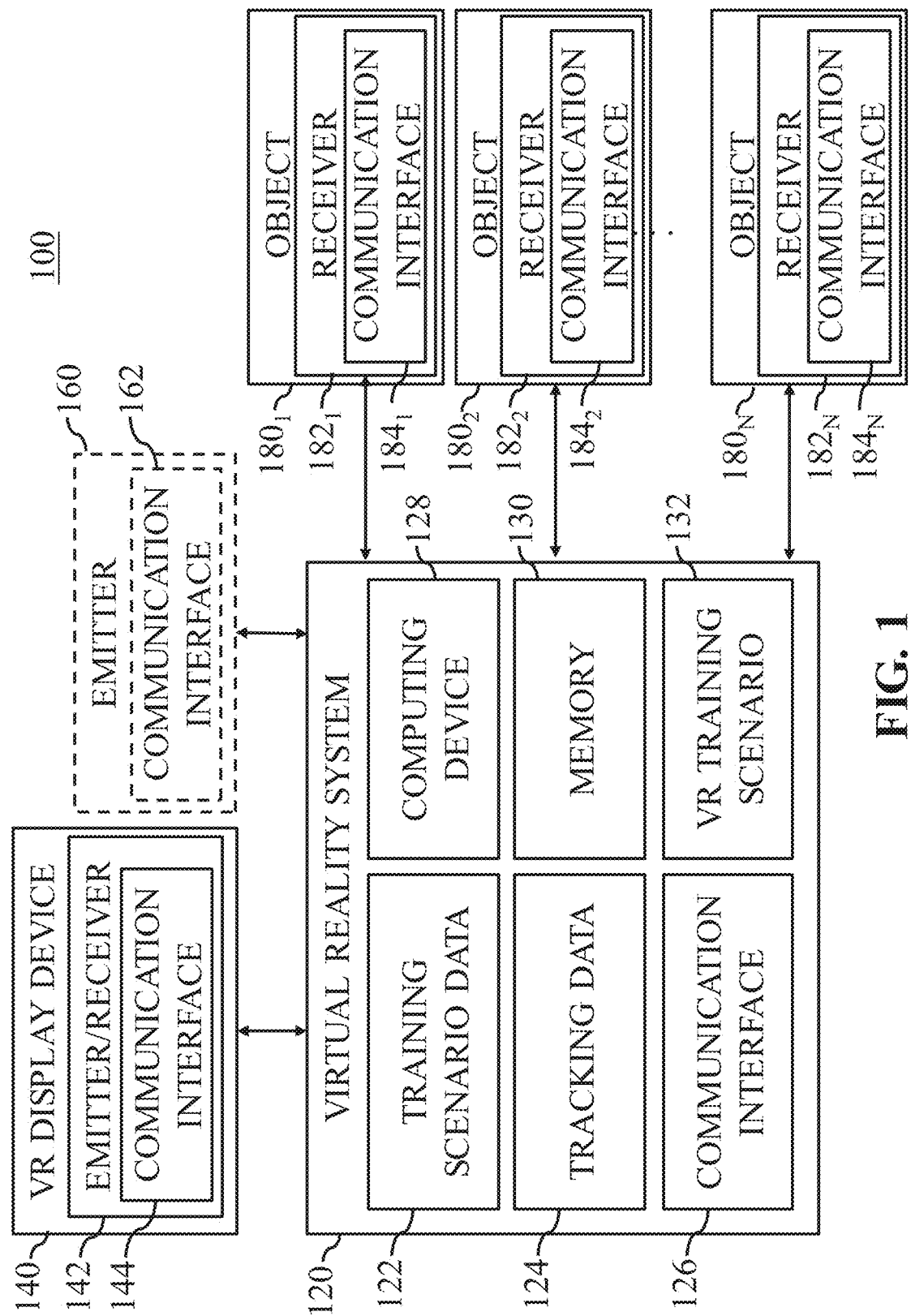
FIG. 1 is a block diagram of an extended reality training system according to an embodiment.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the illustrative embodiments. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

With reference to FIGS. 1-4, a system 100 is disclosed that employs extended reality (XR) to train police officers, the military or others in the use of weapon systems or tools such as, e.g., guns, electronic control weapons, grenades, breaching tools or any other weapon systems or tools that may be utilized in specific training scenarios or situations. A user of system 100 may interact with physical objects $180_1$, $180_2$, $180_3$, $180_4$, $180_5$, $180_6$, . . . $180_N$, also referred to individually and collectively as object(s) 180, that are integrated into an XR training scenario through the use of a tracking technology and an XR system 120. XR system 120 may comprise a virtual reality (VR) system, a mixed-reality (MR) system, an augmented reality (AR) system or any other type of XR system. In some embodiments, XR system 120 may comprise a combination of two or more of VR, MR, AR and any other XR technologies.

In an example, the user may be provided with an object 180 such as, e.g., an actual weapon system, a training weapon system that simulates an actual weapon system, a tool or another object, that is connected to XR system 120 by the tracking technology. Physical environmental objects 180 that a user may interact with such as, e.g., windows, doors, tables, chairs, walls or other environmental objects, may also be connected to XR system 120 by the tracking technology to enable user interactions with such environmental objects 180 during an XR training scenario 132. While described herein as XR training scenarios, one or more of VR, MR and AR training scenarios may also or alternatively be implemented.

Figure 2:
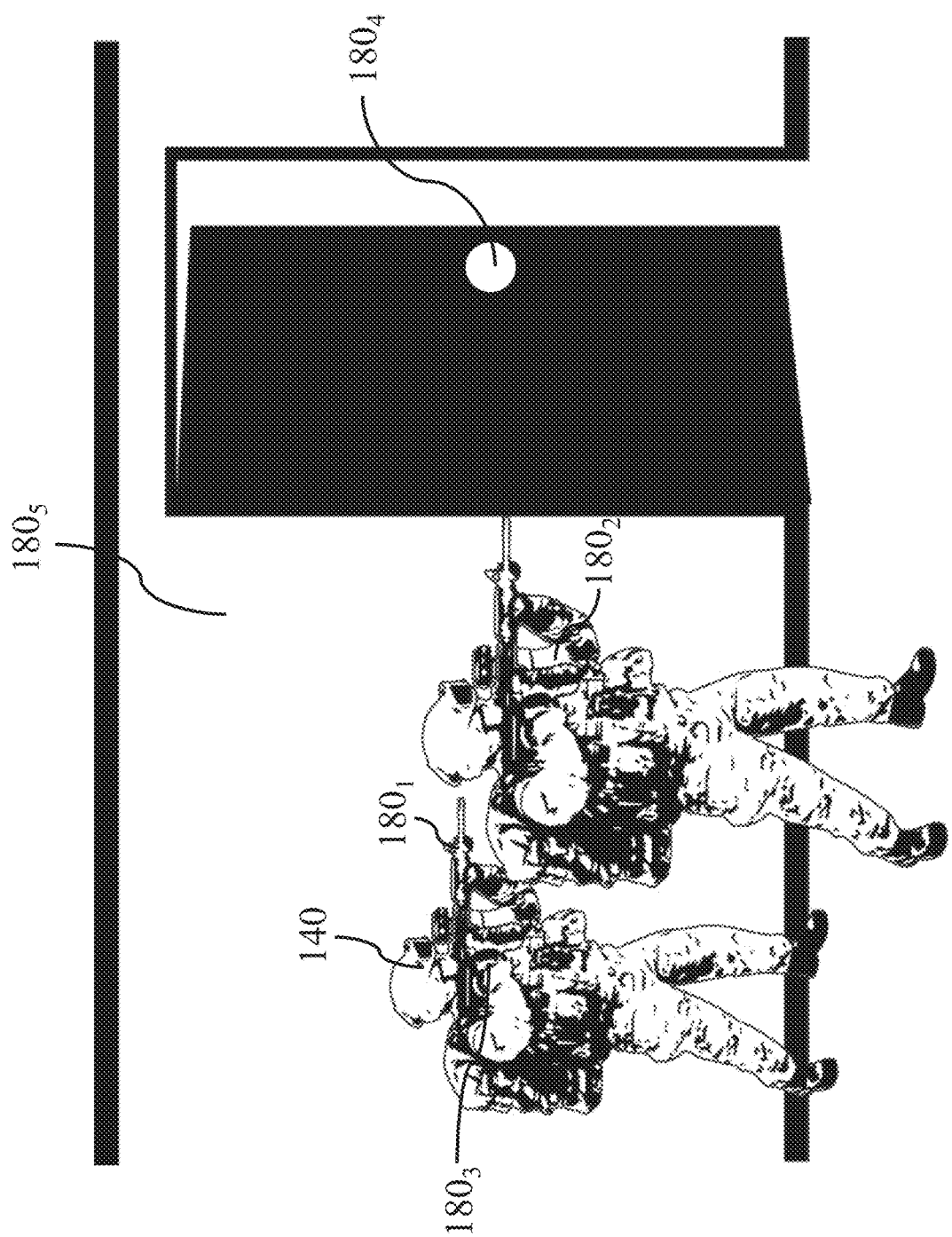
FIG. 2 is a diagram of an example training space according to an embodiment.
Figure 3:
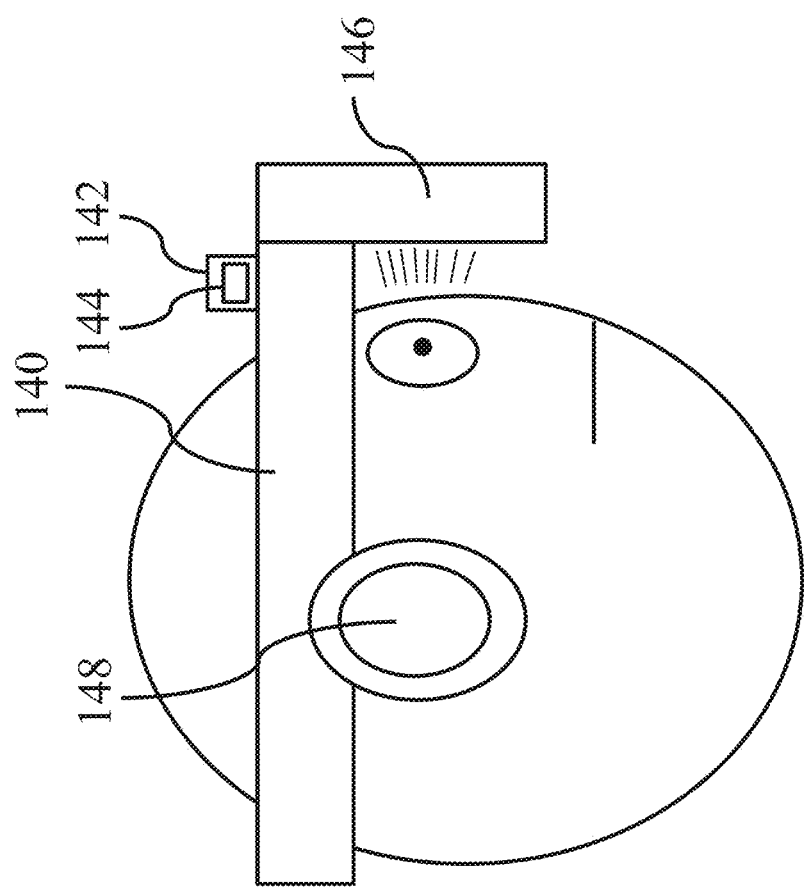
FIG. 3 is a block diagram of an extended reality display device of the extended reality training system of claim 1 according to an embodiment.

With reference to FIGS. 1-3, the user may wear an XR display device 140 such as, e.g., a VR, MR, AR or any other XR goggle, headset, smart glasses or another display device, that is connected to XR system 120 and is configured to present an XR training scenario 132 to the user that is generated in accordance with training scenario data 122 by XR system 120. XR display device 140 comprises a display 146 such as, e.g., a head mounted display, monitor, smart glass, or other display, that a user can place over or near the user's eyes to create an immersive visual experience. XR display device 140 may also comprise one or more audio devices 148 that are configured to present audio to the user. Throughout the XR training scenario 132, the user's interaction with or use of objects 180 may be tracked by the tracking technology and provided to XR system 120 for integration into the XR training scenario 132 presented to the user via XR display device 140.

System 100 is configured to provide improved user immersion by enabling realistic interactions with objects 180 in the real world. During stressful situations that users such as first responders, military personnel or other users often encounter, they are often tasked with making critical life and death decisions in seconds or even milliseconds. In these kinds of stressful situations, the human body typically reverts to decision making that is based on instinct and muscle memory. Instinct and muscle memory can only be developed through consistent training that accurately replicates the stress and other attributes of such situations, e.g., using training scenarios.

A training scenario is more effective when it is both realistic and immersive such that stressful situations may be accurately represented to a user to develop the appropriate instinct and muscle memory. To create an XR training scenario that is realistic and immersive, it may be useful to include the objects, e.g., weapons systems or other objects, that are often utilized by the user during such stressful situations as part of the training scenario in a realistic and immersive manner so that a user can build the muscle memory and instincts using such objects that the user relies on during the stressful situations.

When including tools in an XR training scenario, it may be important to utilize an accurate representation of the object in both the physical and virtual worlds. For example, when incorporating a weapon system, such as a rifle, both the physical and virtual characteristics of the rifle should accurately match the rifle that the user carries into stressful situations as much as possible. Such characteristics may include, e.g., weight, balance, dimensions, recoil, accuracy or any other characteristics of the actual object used by the user during stressful situations.

In addition, interactions with the object by the user, e.g., movement or changes in a location or orientation of the object by the user, actuation or activation of switches, triggers or other components of the object, or any other interactions need to be incorporated and represented in the XR training scenario in a realistic and immersive manner. In order to realistically and immersivity implement such interactions, the location and orientation of each object may be tracked in the physical space so that they can be accurately represented in the virtual space. With small objects, such as, e.g., pistols, flashlights, grenades or other small objects, adding bulky external tracking devices may be impractical and break the realism and immersion of the training scenario where, for example, the user may come in contact with the tracking device or feel a difference in weight distribution due to the inclusion of the tracking device. In addition, such bulky external tracking devices may implement technologies that rely on line-of-sight or other tracking methods that may inhibit a realistic and immersive representation of an object in the XR training scenario. For example, it may be difficult to realistically and immersivity represent an object such as a pistol that has multiple interactive or moving components such as, e.g., a separable magazine, trigger and firing mechanisms, a recoil mechanism or other components, using some tracking technologies in a manner that accurately and immersivity presents the object in the XR training scenario to the user.

As an example, a weapon system such as a pistol or rifle may have physical functionality such as recoil, reloading or other physical functionality that may impact the location or orientation tracking accuracy of some tracking technologies. For example, the accuracy of a tracking technology that relies on acceleration or angular velocity to track the location or orientation of a weapon system may be disrupted by the recoil, high acceleration movements or vibrations of the weapon system during firing. Similarly, the accuracy of tracking of a thrown object such as, e.g., a grenade, may be decreased due to the impact of the grenade with another object such as the floor or a wall. As another example, the accuracy of a tracking technology that relies on line of sight to track the location or orientation of a weapons system or other objects may be disrupted by close proximity between multiple objects, e.g., during user interactions with those objects. For example, if a user takes cover behind a chair, table, wall or another object, or otherwise interacts with the other object in a manner that blocks line of sight to a tracking device attached to the user or another object, the accuracy of the line-of-sight tracking technology may be disrupted or inhibited.

System 100 utilizes a tracking technology that is configured to enable the accurate tracking and use of objects 180 having physical functionality such as recoil or other physical functionality in a manner that increases user immersion while engaged in the XR training scenario. In addition, the tracking technology also enables user interaction with the physical environment such as, e.g., walls, floors, chairs or other objects 180, or other objects without sacrificing tracking accuracy which further enhances user immersion in the XR training scenario.

System 100 enables a user to experience immersive training programs for real world situations including training in actual buildings, in large spaces and in and around physical obstacles. System 100 also allows users to train on and learn the skills to properly traverse various kinds of rooms, spaces and environments and to physically interact with objects 180 such as weapon systems, tools and environmental objects in a manner that directly correlates to real world situations. For example, the user of system 100 is enabled to utilize weapon systems with real physical functionality such as recoil, vibration, reloading or other physical functionality, and to interact with environmental objects, e.g., leaning against walls, opening doors, resting body parts on physical objects such as tables, railings, windows, furniture or any other environmental interactions, all while training in an XR training scenario.

In an embodiment, the tracking technology utilized by system 100 comprises a magnetic tracking technology. A magnetic tracking technology enables the tracking of object locations and orientations, or the relative location and orientation between two objects, based on electromagnetic fields (EMFs). As an example, a triaxial antenna may be utilized as an emitter or a receiver of EMFs. In some embodiments, the triaxial antenna may comprise a magnetic core and three coils wound around the magnetic core orthogonal to each other to define an X-axis coil, a Y-axis coil and a Z-axis coil. The triaxial antenna is configured to both emit and receive electromagnetic signals in any of the three axes of space, e.g., the X-axis, the Y-axis and the Z-axis, therefore allowing an accurate emission and reception regardless of the position of the triaxial antenna. While a triaxial antenna is provided as an example magnetic tracking technology, any other magnetic tracking technology may alternatively be utilized including an antenna with a greater or smaller number of axes, a greater or smaller number of coils, an emitter with an equal number of coils to a receiver, an emitter with a greater number of coils than the receiver, an emitter with a smaller number of coils than a receiver or any other magnetic tracking technology. The use of a magnetic tracking technology in system 100 enables accurate tracking of interactions between a user and tracked objects that would otherwise be disrupted in other tracking technologies due to the close proximity between the user and the objects, due to functionality of the objects such as recoil or due to any other tracking disruption.

With reference again to FIGS. 1 and 2, system 100 comprises an emitter 160 and objects $180_1$, $180_2$, ... $180_N$ comprise respective receivers $182_1$, $182_2$, ... $182_N$ which collectively form a magnetic tracking technology such as that described above. Receivers $182_1$, $182_2$, ... $182_N$ are individually and collectively referred to as receiver(s) 182. Emitter 160 and receivers 182 may each comprise a triaxial antenna such as that described above or any other magnetic tracking technology and work in conjunction to determine and provide tracking data 124 corresponding to a location and orientation of each object 180 to XR system 120, e.g., X, Y and Z coordinates, pitch, yaw and roll or any other tracking data 124. In some embodiments, one or more of objects 182 may also or alternatively comprise emitters 160.

In one example embodiment, receiver 182 comprises a magnetic field sensor having three coils each oriented at a ninety-degree angle to each other that enable receiver 182 to determine tracking data 124 corresponding to a location and orientation of receiver 182 in a three-dimensional space relative to a reference location and orientation such as, e.g., the location and orientation of emitter 160. The reference location and orientation may be a location and orientation of emitter 160, a location and orientation of a receiver 182 or any other reference location and orientation, e.g., as defined by XR system 120. In other embodiments, the magnetic field sensor may comprise any other number of coils oriented in any other configuration and any other magnetic field detection technology may also or alternatively be utilized for the magnetic field sensor.

In some embodiments, XR display device 140 comprises an emitter/receiver 142 which is configured to function as an emitter 160 or a receiver 182. For example, in an embodiment where emitter/receiver 142 functions as an emitter 160, a separate emitter 160 may not be needed. In other embodiments, emitter/receiver 142 may function as a receiver 182 such that tracking data 124 for a location and orientation of XR display device 140 relative to a location and orientation of emitter 160 or another reference location and orientation may be tracked and provided to XR system 120, e.g., as the user's head moves and changes orientation.

In some embodiments, emitter 160 may be attached to the user as part of a wearable device, e.g., attached to a belt, integrated into clothing, attached to another object of the user or attached in any other manner including being attached to or integrated as part of XR display device 140, e.g., as emitter/receiver 142. In some embodiments, emitter 160 is attached to another object 180, to a portion of the environment such as a floor, wall, ceiling, or may be present in the training space in any other manner.

Emitter 160 and receivers 182 may be embedded within or attached to a variety of objects 180 such as, e.g., an XR headset, training or actual weapons, clothing, tools, walls, doors, windows, counters, tables, other environmental objects or any other objects. This allows XR system 120 to provide a trainee with rendered representations of such objects 180 at corresponding locations and orientations in the XR space that the trainee may then use or interact with in the physical space.

With reference again to FIG. 1, emitter/receiver 142, emitter 160 and receivers $182_1$, $182_2$, ... $182_N$ comprise respective communication interfaces 144, 162 and $184_1$, $184_2$, ... $184_N$ that are configured to connect to communication interface 126 of XR system 120 via wired or wireless connections or networks. Communication interfaces $184_1$, $184_2$, ... $184_N$ are also collectively and individually referred to herein as communication interface(s) 184. In some embodiments, for example, one or more of communication interfaces 144, 162 and 184 may be connected to communication interface 126 via a wired connection or network while the remaining communication interfaces 144, 162 and 184 are connected via a wireless connection or network. In other embodiments, all of communication interfaces 144, 162 and 184 may be connected to communication interface 126 via one or more wireless connections or networks. The wired or wireless connections may be direct connections between communication interfaces 144, 162 and 184 and communication interface 126 or connections via one or more wired, wireless or combined wired/wireless networks. Example wired and wireless connections and networks that may be integrated into or utilized by communication interfaces 126, 144, 162 and 184 include the Internet, a wide area network (WAN), a local area network (LAN), satellite, telephone, cable, a fiber-optic, cellular, ethernet, WiFi, WiMAX, Bluetooth®, any other network or connection or any combination thereof.

While described herein as being part of emitter/receiver 142, emitter 160 and receivers 182, in some embodiments some or all of communications interfaces 144, 162 and $184_1$, $184_2$, ... $184_N$ may also or alternatively be separate components from emitter/receiver 142, emitter 160 and receivers 182. For example, XR display device 140 may comprise a communication interface 144 that is separate from emitter/receiver 142 and may be utilized by emitter/receiver 142 to provide tracking data 124 to XR system 120. In another example, communication interface 162 may be a separate component from emitter 160 and may be utilized by emitter 160 to provide tracking data 124 to the XR system. In yet another example, objects 180 may comprise communication interfaces 184 that are separate from receivers 182 and may be utilized by receivers 182 to provide tracking data 124 to XR system 120. In some embodiments, any of XR display device 140, emitter 160 and object 180 may comprise multiple communication interfaces for providing or receiving tracking data 124 or any other data to or from XR system 120.

Emitter/receiver 142 and receivers 182 are configured to generate tracking data 124 based on magnetic fields generated by emitter 160 or emitter/receiver 142, e.g., based on an interaction between the coils of a triaxial antenna or other magnetic tracking technology integrated into the emitter/receiver 142 and receivers 182 and the magnetic fields generated by emitter 160 or emitter/receiver 142. In some embodiments, emitter 160, emitter/receiver 142 and receivers 182 may comprise processing devices, processors, circuitry, or other components that are configured to generate the tracking data 124 based on the detected magnetic fields and provide the tracking data 124 to communication interface 126 via a wired or wireless connection, e.g., using communication interfaces 144 and 184. In other embodiments, raw data may be generated from the detected magnetic fields by emitter/receiver 142 and receivers 182 and provided to communication interface 126 for processing by XR system 120 into tracking data 124.

While emitter/receiver 142 and emitter 160 are described herein as generating magnetic fields and emitter/receiver 142 and receivers 182 are described herein as detecting magnetic fields, in other embodiments, any of emitter/receiver 142, emitter 160 and receivers 182 may selectively function as an emitter or receiver to generate or detect magnetic fields and provide corresponding raw data or tracking data 124 to communication interface 126 of XR system 120 via the wired or wireless connections. As an example, in some embodiments, during the presentation of a training scenario by XR system 120 to the user via XR display device 140, XR system 120 may selectively switch one or more of emitter/receiver 142, emitter 160 and receivers 182 from acting as a receiver to acting as an emitter or vice versa as needed to generate or detect magnetic fields and generate corresponding tracking data 124 for the various locations and orientations of XR display device 140, emitter 160 and objects 180. For example, as the magnetic field strength of a magnetic field generated by emitter/receiver 142 or another emitter 160 located near the user drops off over a distance, XR system 120 may selectively switch a receiver 182 that is located farther away from the user than emitter/receiver 142 or the other emitter 160 to act as an emitter and generate its own magnetic field. The magnetic field generated by the switched receiver 182 may then be detected by receivers 182 that are even further away from the user and the emitter/receiver 142 or emitter 160 that was originally generated by the magnetic field. The magnetic field generated by the switched receiver 182 may also be detected by emitter/receiver 142 or emitter 160, which may be also switched to act as a receiver. Switching the source of the magnetic field may enable more accurate tracking of the relative location and orientation of objects 180 that are more distant from the user, e.g., the location of XR display device 140, or may be utilized in any other manner.

With reference to FIG. 1, XR system 120 comprises a computing device 128 and memory 130. Computing device 128 may comprise, e.g., a processor, a microprocessor, a microcontroller, an application-specific integrated circuit (ASIC), a field-programmable gate array (FPGA), a graphics processing unit (GPU), a printed circuit board (PCB) or any other type of processing circuitry, as well as portions or combinations of such circuitry elements. Memory 130 may comprise, e.g., random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

XR system 120 is configured to store or obtain training scenario data 122, to obtain tracking data 124 from emitter/receiver 142 and receivers 182 and to process the obtained tracking data 124 and training scenario data 122 to generate an XR training scenario 132. In some embodiments, training scenario data 122 is stored in memory 130 of XR system 120. In other embodiments, training scenario data 122 may be obtained from a server or other remote storage location. XR system 120 is configured to provide XR training scenario 132 to XR display device 140 for presentation to the user, e.g., via communication interface 126.

XR training scenario 132 is generated by XR system 120 by combining training scenario data 122 and tracking data 124. For example, training scenario data 122 may comprise attributes, settings, renderings, object textures, code or other data that is utilized to generate and implement an XR training scenario 132. Training scenario data 122 also comprises attributes, representations, renderings, textures or other graphical features that correspond to each object 180 or type of object 180 that may be included in XR training scenario 132. As an example, training scenario data 122 may comprise attributes, representations, renderings, textures or other graphical features that correspond to environmental objects 180 such as, e.g., walls, doors, chairs, couches, windows or any other environmental object that may be presented to the user as part of XR training scenario 132 and in some cases that the user may interact with, e.g., opening a door or window, leaning against a wall, etc. As another example, training scenario data 122 may also comprise attributes, representations, renderings, textures or other graphical features that correspond to weapon systems or tools that may be utilized by a user in XR training scenario 132.

Training scenario data 122 comprises an object model for each object 180 or type of object 180 that may be presented to the user in XR training scenario 132. Each object model comprises a corresponding coordinate system specific to that model. For example, a coordinate system of the object model corresponding to object $180_1$, e.g., a rifle, in training scenario data 122 may comprise a coordinate system with X, Y and Z coordinates of 0, 0, 0 located at the tip of the barrel or located at any other location on the object model. Similarly, an orientation of the object model representing object $180_1$ in the coordinate system of the object model may also be defined in training scenario data 122. The location and orientation of receiver $182_1$ relative to object $180_1$ in the physical space is also known. In order to accurately display the object model of object $180_1$ in the virtual space when generating XR training scenario 134, XR system 120 utilizes the location and orientation in the tracking data 124 for object $180_1$ to determine a location and orientation relative to the user, e.g., the location and orientation of XR display device 140, for presentation of the object model for object $180_1$ in the virtual space, but also transforms the determined location and orientation based on the known location and orientation of the receiver $182_1$ on object $180_1$ relative to the coordinate system of the object model for object $180_1$. Based on the transformation, the location and orientation of the object model for object $180_1$ in the virtual space relative to the user may accurately match the location and orientation of object $180_1$ in the physical space relative to the user such that a user attempting to interact with the object model for object $180_1$ in XR training scenario 134 will be able to accurately interact with object $180_1$ in the physical space. Similar transformations may be utilized for the presentation of object models for any of objects 180.

In some embodiments, the attributes for each object 180 in training scenario data 122 may, for example, define a shape, size, material or other aspect of each object 180. The attributes may correspond to characteristics of the physical object 180 in the physical training space, e.g., the height, width, depth, shape or other physical characteristic of the object 180 such that the physical object may be rendered in the XR training scenario 132 as accurately as possible. In some embodiments, the attributes for an object 180 may comprise textures or other features for the object that may be modified by XR system 120 as needed to generate a desired XR training scenario 132. In this manner, the physical object characteristics may be rendered accurately while the visual object characteristics may be adjusted for each XR training scenario 132.

With reference to FIGS. 1 and 2, tracking data 124 obtained by XR system 120 for each of XR display device 140, emitter 160 and objects 180 is linked to the corresponding object models, representations, renderings, textures or other graphical features in the training scenario data 122 such that the physical locations and orientations of XR display device 140, emitter 160 and objects 180 are accurately represented in the XR training scenario 132 presented to the user. As an example, receiver $182_1$ for object $180_1$, e.g., a weapon system such as a rifle, may have a corresponding identifier or other information that is utilized by XR system 120 to link the tracking data 124 obtained from receiver $182_1$ to the corresponding object models, representations, renderings, textures or other graphical features for object $180_1$ in the XR training scenario 132. As mentioned above, the location and orientation in tracking data 124 may be transformed based on the coordinate system for the corresponding object model.

In this manner, as the physical location and orientation of object $180_1$ change, e.g., due to a movement of object $180_1$ or interaction with object $180_1$ by the user such as aiming at a target, firing, recoil, etc., tracking data 124 obtained from receiver $182_1$ by XR system 120 for object $180_1$ is updated and the location and orientation of the corresponding object model, representations, renderings, textures or other graphical features in the XR training scenario 132 for object $180_1$, e.g., the virtual representation of the weapon system, are also updated accordingly.

XR display device 140 is configured to communicate with the XR system 120, e.g., via communication interfaces 126 and 144, to obtain audio/visual data that corresponds to the generated XR training scenario 132 for presentation to the user. XR display device 140 is configured to utilize the audio/visual data to present an interactive audio/visual experience to the user, e.g., via display 146 and audio device 148. For example, XR display device 140 presents the user with a three-dimensional first person-view of a virtual environment according to the XR training scenario 132. In the environment, virtual representations of various objects, textures and other components of the XR training scenario 132 are rendered and presented to the user including virtual representations of the various objects 180 that are being tracked by the magnetic tracking technology.

With reference to FIGS. 1 and 2, in one example, object $180_1$ may comprise a weapon system, e.g., a pistol, a rifle, an electronic control weapon or another weapon system, that may be presented to the user by XR display device 140 based on tracking data 124 obtained by XR system 120 from an attached receiver $182_1$. The user may interact with the weapon system, e.g., pick up the weapon system, fire the weapon system, etc., and any changes in the location or orientation of the weapon system are tracked by the corresponding receiver $182_1$ and updated in the XR training scenario 132 by XR system 120 based on the obtained tracking data 124 and training scenario data 122.

In some embodiments, one or more components of the weapon system may be considered separate objects 180 and have separate receivers 182 such that separate tracking of those components may be performed. As an example, a magazine, or other removable component may be designated as its own object, e.g., object $180_2$, and presented as a separate object in the XR training scenario 132. By obtaining tracking data 124 for both the weapon system, object $180_1$, and the magazine, object $180_2$, user interactions with each object 180 may be separately tracked and interactions between the objects 180 may also be tracked. As an example, an activity such as, e.g., a reload of the weapon system, may be tracked by obtaining tracking data 124 from both receiver $182_1$ and receiver $182_2$, where the location and orientation of each object 180 may be updated and presented in the XR training scenario 132 by XR display device 140 during the activity as described above.

In another example, an object $180_3$ having a receiver 182 may be attached to the user's hands, e.g., as part of a piece of apparel such as a glove, bracelet or another object that corresponds to the user's hands. A representation of the user's hands may be presented to the user by XR display device 140 based on tracking data 124 obtained by XR system 120 from the receiver 182 attached to object $180_3$ that is used to update the location and orientation of the user's hand in the XR training scenario 132. In some embodiments, where the magnetic tracking technology is sufficiently small and lightweight, the location and orientation of each finger on the user's hand may be tracked by a corresponding receiver 182, providing a more accurate representation of the user's interactions within the XR training scenario 132 as presented by XR display device 140.

In another example, an object $180_4$ may comprise a door that may be presented to the user by XR display device 140 based on tracking data 124 obtained by XR system 120 from an attached receiver 182. The user may interact with the door, e.g., turn the doorknob, open or close the door, etc., and any changes in the location or orientation of the door are tracked by the corresponding receiver 182 and updated in the XR training scenario 132 by XR system 120 based on the obtained tracking data 124 and training scenario data 122. In some embodiments, the receiver 182 may be attached to the doorknob such that changes in orientation of the doorknob, e.g., due to the user rotating the doorknob to open the door, may also be reflected in the XR training scenario 132.

In another example, an object $180_5$ may comprise a wall that may be presented to the user by XR display device 140 based on tracking data 124 obtained by XR system 120 from an attached receiver 182. The user may interact with the wall, e.g., approach the wall, lean against the wall, etc., with the relative locations of the user and the wall being tracked by corresponding receivers 182 (or emitter/receiver 142 and the receiver 182 for the wall) and updated in the XR training scenario 132 by XR system 120 based on the obtained tracking data 124 and training scenario data 122. As mentioned above, such close proximity and interactive tracking between objects 180 and the user is enabled by the use of a magnetic tracking technology where, for example, motion, acceleration, line of sight and other similar techniques are not needed to perform the tracking.

In another example, one or more user locations relative to the wall may be tracked and utilized as part of the XR training scenario 132. As an example, XR system 120 may track the locations and orientations of users on both sides of the wall, e.g., using tracking data 124 obtained from a corresponding emitter/receiver 142 of each user, and present rendering or representations of the users as part of the XR training scenario 132, e.g., during a breach or entry into a new room. As an example, an emitter/receiver 142 or emitter 160 attached to or worn by a first user may generate a magnetic field that extends through the wall and is detected by a receiver 182 attached to the wall and a corresponding emitter/receiver 142 or receiver 182 attached to a second user. Since magnetic fields do not require line of sight, tracking data 124 that indicates the location of the second user is determined by the emitter/receiver 142 of the second user based on the detection of the magnetic field generated by the emitter/receiver 142 or emitter 160 of the first user, or vice versa, thereby allowing XR system 120 to determine the relative locations and distances between the first user, second user and wall. The XR training scenario 132 may then be generated based on the tracking data 124 and scenario training data 122 and presented to the first user, the second user or both. In a case where the first and second users are located on opposing sides of the wall, the second user would not be rendered for the first user or vice versa in the XR training scenario 132 unless otherwise specified by the XR training scenario 132.

For example, in a case where various optics are utilized in the XR training scenario 132 such as, e.g., thermal imaging, XR display device 140 may present the first user having such optics with a rendering of a thermal image of the second user on the other side of the wall as appropriate, thereby increasing the realism of the scenario.

In some embodiments, an orientation of a weapon system relative to the wall as determined by the tracking data 124 obtained from corresponding receivers 182 may also be utilized by XR system 120 to generate XR training scenario 132. For example, a calculated bullet path, calculated bullet deflection due to impact with the wall and other realistic interactions may be implemented in the XR training scenario 132 based on the tracking of the locations and orientations of the wall and weapon system using corresponding receivers 182.

In some embodiments, objects 180 such as, e.g., doors, walls, or any other objects, may be given attributes that define a material type and other properties. As an example, a concrete or metal wall in the XR training scenario 132 may be given different bullet deflection properties than a sheet-rock or wood wall even if the physical wall in the training space is made of another material. In this manner, the XR training scenario 132 may be modified or customized as appropriate for any environment, regardless of the material type and properties of the physical objects 180 in the training space. In one example, a wall may be given an attribute that defines it as a broken-down wall having holes in it which may then be rendered in the XR training scenario 132. In a case where the first and second users are on opposing sides of such a wall, XR system 120 may determine sight lines through the broken down wall based on the tracking data 124 obtained from the receiver 182 attached to the wall, an attribute corresponding to the wall that indicate locations of such holes in the training scenario data 122, tracking data 124 obtained from emitter/receivers 142 of each user or any other tracking data 124 and may generate and provide the XR training scenario 132 to XR display device 140 for presentation to the user accordingly.

Figure 4:
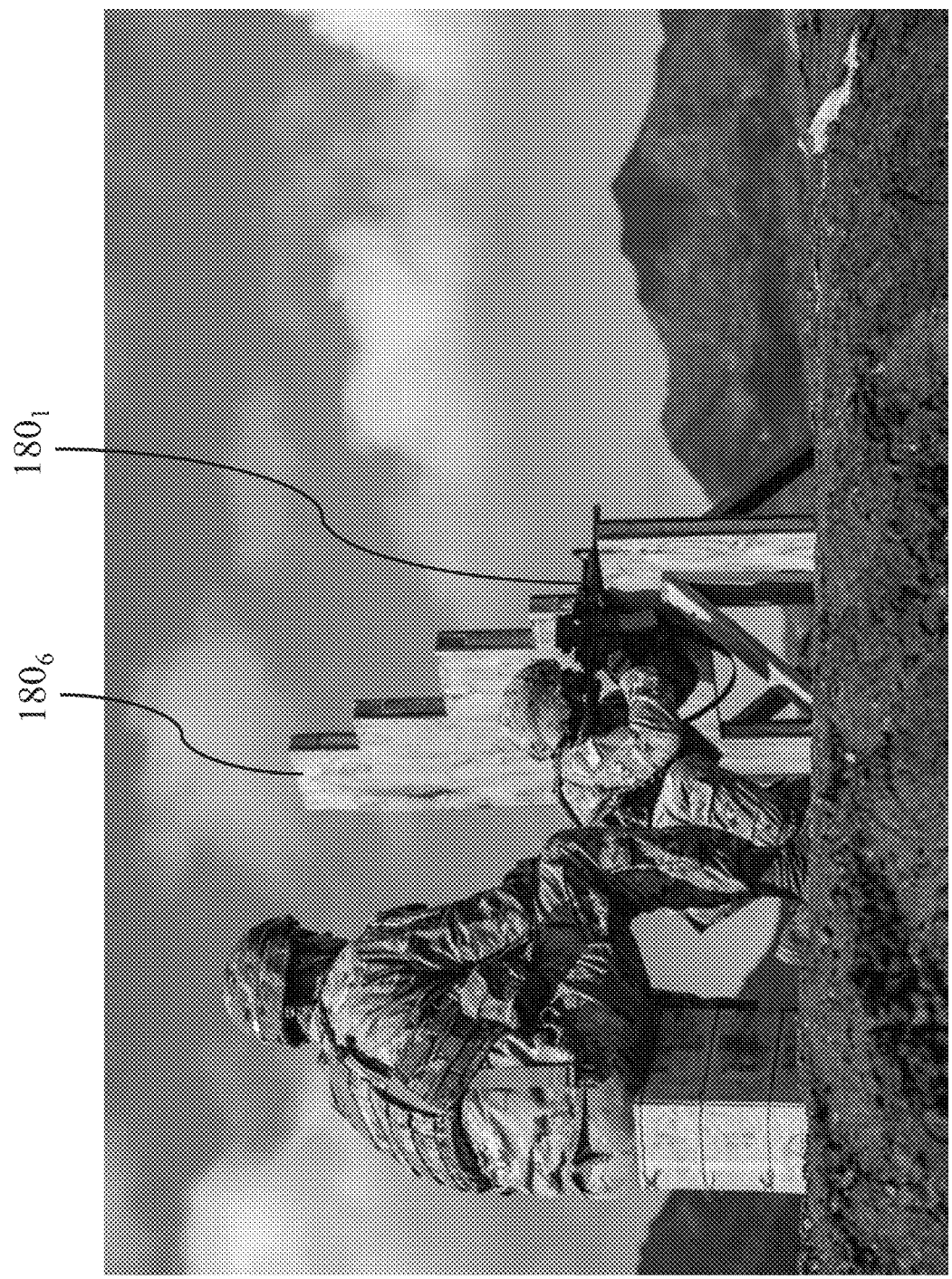
FIG. 4 is a diagram of another example training space according to an embodiment.

With reference now to FIG. 4, in another example, an object $180_6$ may comprise a surface or structure on which a user may lean an object 180 such as a weapon system, e.g., object $180_1$, portion of their body or another tool. As an example, object $180_6$ may comprise a receiver 182 and have a predefined shape in the training scenario data 122 that matches its physical shape such that when object $180_6$ is presented in XR training scenario 132 by XR display device 140, an accurate representation of the shape, location and orientation of object $180_6$ is presented to the user. The user may then physically interact with object $180_6$ in the physical training space while viewing an accurate representation of the object in the XR training scenario 132. In some embodiments, for example, attributes corresponding to the shape of object $180_6$ in the XR training scenario 132 may be predefined in the training scenario data 122 to correspond to the physical shape of object $180_6$ in the physical training space while other attributes of object $180_6$ in XR training scenario 132, e.g., texture, look and feel, etc., may be modified as needed by XR system 120 based on the training scenario data 122 to generate the desired XR training scenario 132.

In some embodiments, other types of XR training scenarios may be implemented by system 100. As an example, system 100 may be utilized for any other type of training including driver training, aviation training, or any other type of training that includes user interactions with objects. As an example, a truck driver may receive training using system 100 where, for example, objects 180 may comprise the steering wheel, gear shifter, or any other object 180 that the truck driver may manipulate or otherwise interact with during. In another example, a pilot of a helicopter or airplane may receive training using system 100 where, for example, objects 180 may comprise steering yokes, switches, levers, rudder pedals, avionics controls or any other objects 180 that the pilot may manipulate or otherwise interact with. In another example, a user participating in a dangerous activity or profession may receive immersive and realistic XR training using system 100 that enables the user to interact with the environment such as, e.g., deep sea diving and salvage, mining, space or any other field.

Figure 5:
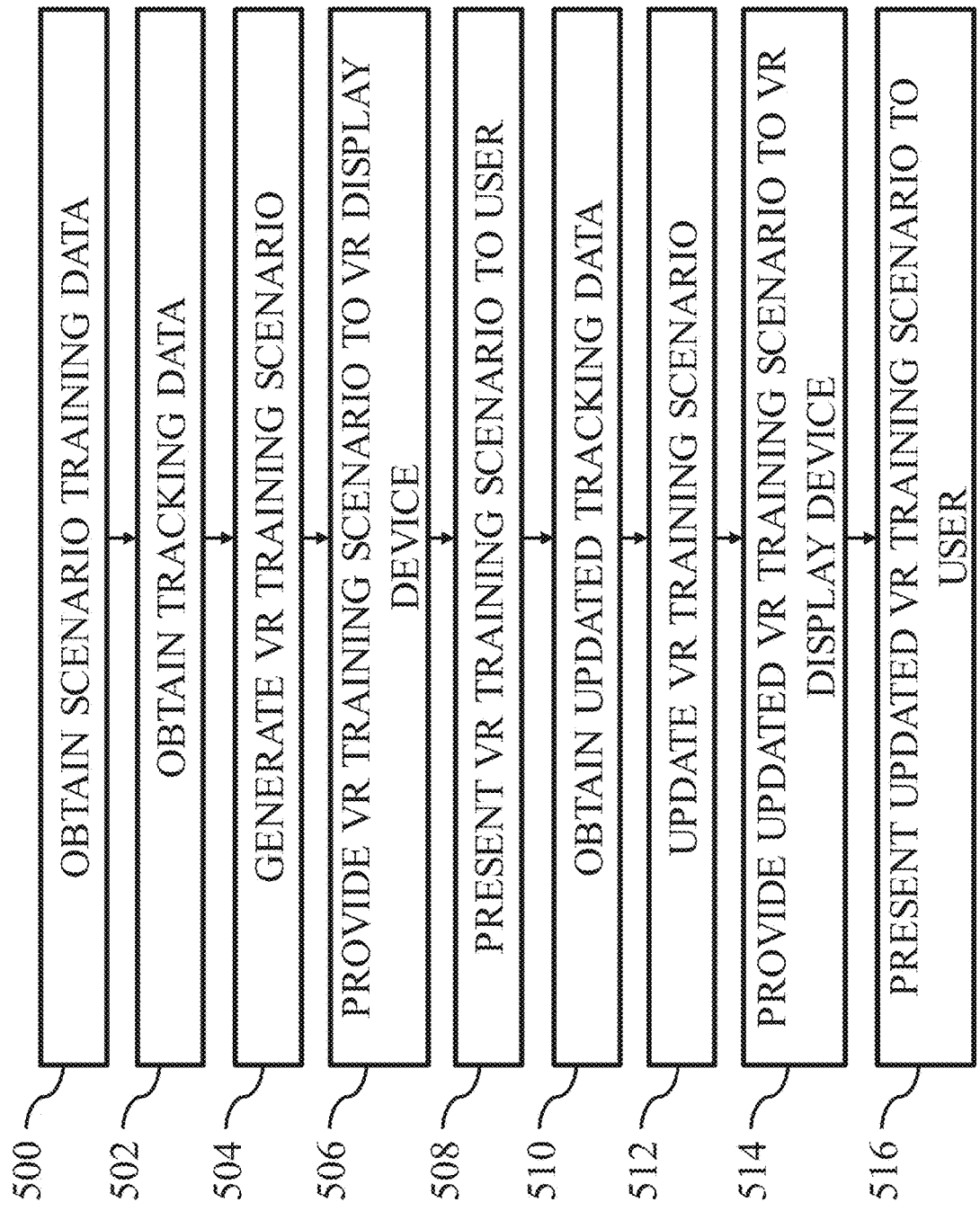
FIG. 5 is a flow diagram of a process for presenting an extended reality training scenario to a user according to an embodiment.

With reference to FIG. 5, a process of using system 100 to present an XR training scenario 132 to a user will now be described. The process of FIG. 5 comprises steps 500 through 516 and is suitable for use in the system 100 but is more generally applicable to other types of systems for generating and presenting XR training scenarios to users.

At step 500, XR system 120 obtains scenario training data 122 for a particular XR training scenario. For example, a user may select the XR training scenario to be presented to a user, e.g., via a user input device (not shown), and the corresponding scenario training data 122 may be obtained by XR system 120.

At step 502, XR system 120 obtains tracking data 124 for one or more objects 180. In some embodiments, for example, XR system 120 may cause emitter/receiver 142 or a separate emitter 160 to generate a magnetic field that is detected by corresponding receivers 182 of the one or more objects 180, e.g., by sending a command or other signal to emitter/receiver 142 or emitter 160 via communication interfaces 144 or 162. The receivers 182 may then provide raw data about the detection or tracking data 124 to XR system 120, e.g., via communication interfaces 184. In the case where a separate emitter 160 is utilized, tracking data 124 for XR display device 140 may also be obtained by XR system 120, e.g., emitter/receiver 142 may detect the magnetic field generated by emitter 160 and send raw data or tracking data 124 to XR system 120 via communication interface 144. In a case where raw data is provided to XR system 120 by one or more receivers 182 or emitter/receiver 142, XR system 120 may generate the corresponding tracking data 124 based on the raw data.

At step 504, XR system 120 generates XR training scenario 132. For example, XR system 120 may combine the obtained tracking data 124 with the scenario training data 122 for the selected XR training scenario to generate XR training scenario 132.

At step 506, XR system 120 provides XR training scenario 132 to XR display device 140, e.g., via communication interface 144 or via another wired or wireless connection.

At step 508, XR display device 140 presents the XR training scenario 132 to the user including representations of any objects 180 that are being tracked at their corresponding locations and orientations as indicated by the corresponding tracking data 124.

At step 510, XR system 120 obtains updated tracking data 124 based on detections of magnetic fields generated by emitter/receiver 142 or emitter 160.

At step 512, XR system 120 updates XR training scenario 132 based on the updated tracking data 124.

At step 514, XR system 120 provides the updated XR training scenario 132 to XR display device 140.

At step 516, XR display device 140 presents the updated XR training scenario to the user, the updated XR training scenario 132 reflecting any changes in locations or orientations of the tracked object 180 relative to the user.

The particular processing operations and other system functionality described in conjunction with the flow diagram of FIG. 5 are presented by way of illustrative example only and should not be construed as limiting the scope of the disclosure in any way. Alternative embodiments can use other types of processing operations involving XR systems, XR display devices, magnetic field emitters, magnetic field receivers, and objects. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the generation and presentation of XR training scenarios within a given training system.

Functionality such as that described in conjunction with the process of FIG. 5 may be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

FIGS. 1 through 5 are conceptual illustrations allowing for an explanation of the disclosed embodiments. Notably, the figures and examples above are not meant to limit the scope of the disclosed embodiments to a single embodiment, as other embodiments are possible by way of interchange of some or all of the described or illustrated elements. Moreover, where certain elements of the disclosed embodiments can be partially or fully implemented using known components, only those portions of such known components that are necessary for an understanding of the disclosed embodiments are described, and detailed descriptions of other portions of such known components are omitted so as not to obscure the disclosed embodiments. In the present specification, an embodiment showing a singular component should not necessarily be limited to other embodiments including a plurality of the same component, and vice-versa, unless explicitly stated otherwise herein. Moreover, terms in the specification or claims are not intended to be ascribed an uncommon or special meaning unless explicitly set forth as such. Further, the disclosed embodiments encompass present and future known equivalents to the known components referred to herein by way of illustration.

It should be understood that the various aspects of the embodiments could be implemented in hardware, firmware, software, or combinations thereof. In such embodiments, the various components and/or steps would be implemented in hardware, firmware, and/or software to perform the functions of the disclosed embodiments. That is, the same piece or different pieces of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description will so fully reveal the general nature of the disclosed embodiments that others can, by applying knowledge within the skill of the relevant art(s) (including the contents of the documents cited and incorporated by reference herein), readily modify and/or adapt for various applications such specific embodiments, without undue experimentation, without departing from the general concept of the disclosed embodiments. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. An extended reality training system comprising:
an extended reality display device;
an emitter located in a physical space, the emitter being configured to generate a magnetic field;
a receiver attached to an object located in the physical space, the receiver being configured to detect the magnetic field along an X-axis, a Y-axis, and a Z-axis;
at least one processor coupled to memory, the at least one processor being configured to:
obtain tracking data for the object based at least in part on the detection of the magnetic field by the receiver, the tracking data indicating a location and orientation of the object;
obtain training scenario data corresponding to an extended reality training scenario;

generate the extended reality training scenario based at least in part on the tracking data and the training scenario data, the extended reality training scenario comprising a representation of the object at a location and orientation in a virtual space determined based on a transformation of the location and orientation of the object indicated by the tracking data; and provide the extended reality training scenario to the extended reality display device, the extended reality display device being configured to present the representation of the object in the extended reality training scenario to a user of the extended reality display device.

2. The extended reality training system of claim 1, wherein the location and orientation of the object indicated by the tracking data is relative to a location and orientation of the emitter.

3. The extended reality training system of claim 2 wherein the emitter is attached to the extended reality display device and the location and orientation of the object indicated by the tracking data is relative to the location and orientation of the extended reality display device.

4. The extended reality training system of claim 1 wherein:
the receiver comprises a first receiver;
the tracking data comprises first tracking data;
the extended reality system further comprises a second receiver attached to the extended reality display device that is configured to detect the magnetic field generated by the emitter;
the at least one processor is further configured to obtain second tracking data for the extended reality display device based at least in part on the detection of the magnetic field by the second receiver, the second tracking data indicating a location and orientation of the extended reality display device; and
generating the extended reality training scenario based at least in part on the first tracking data and the training scenario data comprises generating the extended reality training scenario based at least in part on the first tracking data, the second tracking data and the training scenario data, the representation of the object in the extended reality training scenario being at a location and orientation in the virtual space determined based on a transformation of the location and orientation of the object indicated by the first tracking data relative to the location and orientation of the extended reality display device indicated by the second tracking data.

5. The extended reality training system of claim 1 wherein a linear path between the receiver and the emitter in the physical space is blocked by another object.

6. The extended reality training system of claim 1 wherein obtaining the tracking data comprises obtaining the tracking data from the receiver.

7. The extended reality training system of claim 1 wherein the obtained tracking data indicates a plurality of locations and orientations of the object during movements of the object, the representation of the object in the generated extended reality training scenario moving between a plurality of locations and orientations in the virtual space determined based on a transformation of the plurality of locations and orientations of the object during the movements of the object as indicated by the tracking data.

8. A method performed by at least one processor comprising hardware, the method comprising:

obtaining tracking data for an object located in a physical space based at least in part on a detection of a magnetic field by a receiver attached to the object, the magnetic field being generated by an emitter located in the physical space, the tracking data indicating a location and orientation of the object along an X-axis, a Y-axis, and a Z-axis;

obtaining training scenario data corresponding to an extended reality training scenario;

generating the extended reality training scenario based at least in part on the tracking data and the training scenario data, the extended reality training scenario comprising a representation of the object at a location and orientation in a virtual space determined based on a transformation of the location and orientation of the object indicated by the tracking data; and providing the extended reality training scenario to an extended reality display device, the extended reality display device being configured to present the representation of the object in the extended reality training scenario to a user of the extended reality display device.

9. The method of claim 8, wherein the location and orientation of the object indicated by the tracking data is relative to a location and orientation of the emitter.

10. The method of claim 9 wherein the emitter is attached to the extended reality display device and the location and orientation of the object indicated by the tracking data is relative to the location and orientation of the extended reality display device.

11. The method of claim 8 wherein:
the receiver comprises a first receiver;
the tracking data comprises first tracking data;
the method further comprises obtaining second tracking data for the extended reality display device based at least in part on a detection of the magnetic field by a second receiver attached to the extended reality display device, the second tracking data indicating a location and orientation of the extended reality display device; and
generating the extended reality training scenario based at least in part on the first tracking data and the training scenario data comprises generating the extended reality training scenario based at least in part on the first tracking data, the second tracking data and the training scenario data, the representation of the object in the extended reality training scenario being at a location and orientation in the virtual space determined based on a transformation of the location and orientation of the object indicated by the first tracking data relative to the location and orientation of the extended reality display device indicated by the second tracking data.

12. The method of claim 8 wherein a linear path between the receiver and the emitter in the physical space is blocked by another object.

13. The method of claim 8 wherein:
obtaining the tracking data comprises obtaining the tracking data from the receiver.

14. The method of claim 8 wherein the obtained tracking data indicates a plurality of locations and orientations of the object during movements of the object, the representation of the object in the generated extended reality training scenario moving between a plurality of locations and orientations in the virtual space determined based on a transformation of the plurality of locations and orientations of the object during the movements of the object as indicated by the tracking data.

15. A non-transitory computer-readable medium storing instructions that, when executed by at least one processor, cause the at least one processor to:
- obtain tracking data for an object located in a physical space based at least in part on a detection of a magnetic field by a receiver attached to the object, the magnetic field being generated by an emitter located in the physical space, the tracking data indicating a location and orientation of the object along an X-axis, a Y-axis, and a Z-axis;
- obtain training scenario data corresponding to an extended reality training scenario;
- generate the extended reality training scenario based at least in part on the tracking data and the training scenario data, the extended reality training scenario comprising a representation of the object at a location and orientation in a virtual space determined based on a transformation of the location and orientation of the object indicated by the tracking data; and
- provide the extended reality training scenario to an extended reality display device, the extended reality display device being configured to present the representation of the object in the extended reality training scenario to a user of the extended reality display device.

16. The non-transitory computer-readable medium of claim 15, wherein the emitter is attached to the extended reality display device and the location and orientation of the object indicated by the tracking data is relative to the location and orientation of the extended reality display device.

17. The non-transitory computer-readable medium of claim 15 wherein:
- the receiver comprises a first receiver;
- the tracking data comprises first tracking data;
- the instructions, when executed by the at least one processor, cause the at least one processor to obtain second tracking data for the extended reality display device based at least in part on a detection of the magnetic field by a second receiver attached to the extended reality display device, the second tracking data indicating a location and orientation of the extended reality display device; and
- generating the extended reality training scenario based at least in part on the first tracking data and the training scenario data comprises generating the extended reality training scenario based at least in part on the first tracking data, the second tracking data and the training scenario data, the representation of the object in the extended reality training scenario being at a location and orientation in the virtual space determined based on a transformation of the location and orientation of the object indicated by the first tracking data relative to the location and orientation of the extended reality display device indicated by the second tracking data.

18. The non-transitory computer-readable medium of claim 15 wherein:
- obtaining the tracking data comprises obtaining the tracking data from the receiver.

19. The non-transitory computer-readable medium of claim 15 wherein the obtained tracking data indicates a plurality of locations and orientations of the object during movements of the object, the representation of the object in the generated extended reality training scenario moving between a plurality of locations and orientations in the virtual space determined based on a transformation of the plurality of locations and orientations of the object during the movements of the object as indicated by the tracking data.

* * * * *